United States Patent
Humburg et al.

(10) Patent No.: US 6,724,983 B1
(45) Date of Patent: Apr. 20, 2004

(54) HEATER PART, ESPECIALLY FOR A VEHICLE WATER OR AIR HEATER WHICH IS OPERATED WITH LIQUID FUEL

(75) Inventors: Michael Humburg, Göppingen (DE); Hermann Eppler, Balingen (DE)

(73) Assignee: J. Eberspacher GmbH & Co., Esslingen (DE)

(*) Notice: Subject to any disclaimer, the term of this patent is extended or adjusted under 35 U.S.C. 154(b) by 0 days.

(21) Appl. No.: 09/857,883
(22) PCT Filed: Dec. 2, 1999
(86) PCT No.: PCT/EP99/09431
§ 371 (c)(1), (2), (4) Date: Sep. 28, 2001
(87) PCT Pub. No.: WO00/35692
PCT Pub. Date: Jun. 22, 2000

(30) Foreign Application Priority Data

Dec. 11, 1998 (DE) .......................... 198 57 240

(51) Int. Cl.[7] .................................. B60H 1/22
(52) U.S. Cl. .................. 392/307; 219/202; 237/12.3 C; 165/41
(58) Field of Search .................. 392/307; 219/202; 123/142.5 E, 142.5 R; 237/12.3 C, 12.3 R; 165/41

(56) References Cited

U.S. PATENT DOCUMENTS

| | | | |
|---|---|---|---|
| 3,942,719 A | 3/1976 | Blomberg | |
| 3,989,030 A | * 11/1976 | Friedl | ...................... 126/110 R |
| 4,828,170 A | 5/1989 | Takman | |
| 5,855,319 A | * 1/1999 | Burner et al. | .......... 237/12.3 B |
| 6,034,352 A | * 3/2000 | Gortler et al. | ............... 219/202 |
| 6,422,190 B1 | * 7/2002 | Gortler et al. | ........ 123/142.5 R |
| 6,557,773 B2 | * 5/2003 | Stemmler et al. | ....... 237/12.3 C |

FOREIGN PATENT DOCUMENTS

| | | | |
|---|---|---|---|
| DE | 197 40 062 | 12/1997 | ............ B60H/1/22 |
| JP | 9-210316 | * 8/1997 | |

* cited by examiner

*Primary Examiner*—John A. Jeffery

(57) ABSTRACT

The invention relates to a heater part, especially for a liquid fuel-operated vehicle water or air heater in the form of a supplementary heater or an auxiliary heater with a burner and a heat-exchanger. According to the invention, at least one part of a fuel heater (1) and at least one part of an electric heater (1') are provided as a structural unit, in particular in order to retrofit or expand an electrically operated heater (1') with a heater (1) for fuel operation.

13 Claims, 2 Drawing Sheets

HEATER PART, ESPECIALLY FOR A VEHICLE WATER OR AIR HEATER WHICH IS OPERATED WITH LIQUID FUEL

CROSS-REFERENCES TO RELATED APPLICATIONS

Not applicable.

Statement Regarding Federally Sponsored Research or Development

Not applicable.

BACKGROUND OF THE INVENTION

The invention relates to a heating equipment portion, particularly for a motor vehicle water or air heating equipment, operated with liquid fuel, in the form of a supplementary heater or auxiliary heater with a burner and heat exchanger.

TECHNICAL FIELD

Known motor vehicle water or air heating equipments are supplementary heaters, which contribute to improving the heat supply to the vehicle interior and to the engine when the motor vehicle engine is running, or auxiliary heaters, which make a heat supply available to the vehicle also independently of the engine. The equipments are operated with liquid fuel, namely with the vehicle's own fuel, diesel or gasoline.

Depending on the system, the equipments, because of the liquid fuel operation and the number of components (constructional size, production costs), are at present not unconditionally suitable for the smallest motor costs), are at present not unconditionally suitable for the smallest motor vehicles of the so-called mini type, which are particularly designed for a minimum fuel consumption.

SUMMARY OF THE INVENTION

The invention has as its object to provide a heating equipment portion, particularly for a motor vehicle water or air heating equipment of the kind mentioned hereinabove, which has a compact construction and can have versatile uses for a heating equipment.

The object of the invention is attained by a water or air heating equipment, operated with liquid fuel, of a motor vehicle, in the form of a supplementary heater or auxiliary hater with burner and heat exchanger wherein at least one portion of a fuel-operated heating equipment is provided as a constructional unit together with at least a portion of an electric heating equipment.

A feature of the invention is that at least a portion of a fuel-operated heating equipment is provided with at least a portion of an electric heating equipment, as a constructional unit.

The constructional unit preferably includes at least an electric heating loop oil and an inner or outer jacket portion of a heat exchanger of a fuel-opperated heating equipment, wherein the electric heating loop or coil extends substantially on the outer periphery of the inner jacket portion or on the inner periphery of an outer jacket portion.

The electric heating loop or coil can in particular be provided as an electric heating insert which includes a helicoid heating section arranged on or in the jacket portion, and a straight return section, the electrical connections being situated on the one axial side of the jacket portion.

A simple structure results when the jacket portion has a substantially smooth outer or inner jacket surface.

However, an axial groove in which the return section of the electric heating insert is received is preferably provided in the otherwise smooth jacket surface, along a generating line of the jacket surface. The axial groove provides for an exact peripheral and axial fixation of the electrical heating insert with respect to the jacket portion.

The electrical heating loop or coil can here be constituted as slightly resiliently prestressed in the radial direction, or self-fixing, against the jacket portion.

The return section can have curved end sections which form axial fixation aids for the electrical heating loop or coil with respect to the jacket portion.

The helicoid heating section is preferably matched in shape to the respective outer or inner contour of the jacket portion and forms, with a jacket portion used as the heat exchanger of a fuel operated heating equipment, water or air guiding ribs for a medium (water or air) to be heated as it flows through, also in particular when the jacket surface (except for the axial groove) is smooth.

The electrical connections are in particular passed through a housing end side of a heating equipment, are fastened to the housing end side, and are accessible from outside for a current connection to a current source, in particular a motor vehicle battery.

The constructional unit can have temperature sensors which can be used both for an electric and also for a fuel-operated heating equipment.

The constructional unit is preferably interchangeable in a heating equipment and can be replaced, for example, by a conventional motor vehicle heating equipment heat exchanger.

The versatility of the heating equipment portion according to the invention results particularly from the fact that the constructional unit can be used, on the one hand exclusively as an electric heating equipment, and on the other hand exclusively as a heating equipment operated with liquid fuel, but also that a combined operation is possible in which the constructional unit functions in a heating equipment as a heating device which is operated both electrically and also with liquid fuel. The last-mentioned variant of the invention has a large heat delivery and in particular makes possible a mixed operation or a two-stage operation with only a single control cost. With the second heating stage, the electric heating can easily be switched on in addition when operating with fuel, or vice versa, fuel operation can be switched on in addition when in electric base mode operation.

Thus according to the invention an electric heating insert is combined with a well-established fuel-operated heating equipment insert. The motor vehicle heating equipment containing the said insert is nevertheless compact. The choice of heating energy is basically free. Operation with the selected energy can be arranged in a heating equipment with the aid of simple constructional means.

Thus, for example, a well-established fuel-operated heating equipment portion can be directly made accessible to the smallest type of motor vehicle, and can then be operated with electrical energy by means of the built-in heating coil.

The said well-established fuel-operated heating equipment is the "heat hanger", which of course does not have the function of a heat exchanger when operated electrically, but rather the air or water flowing through is then directly heated by the heating coil.

The "heat exchanger" has, for example, a pot form, with the water (or air) to be heated passing through the peripheral jacket and pot floor. In electric heating operation, the heating coil directly heats the water (or air) flowing through on the jacket side. The hollow interior of the pot of the "heat exchanger" contains no components and is covered at the side opposite the pot floor by a cover.

For the conversion to liquid fuel operation, the said cover is removed and the combustion chamber is installed inside the pot; in particular, the flame tube of the burner is introduced into the pot interior and flange-mounted axially (together with further parts such as a combustion air fan, etc.).

No parts have to be interchanged on changing over from electric heating to fuel heating. Consequently no parts can be lost. The base body, i.e., the jacket portion or the heat exchanger and heating coil, remains or remain in the place in the motor vehicle where they are built in.

If a user of a smallest type motor vehicle later wishes to change over its electric heating according to the invention to operation with diesel or gasoline and use the advantages of the known fuel-operated motor vehicle heating equipments, this is possible in a cost-efficient manner, but is not possible with known electric heaters.

If electric heating is to be completely dispensed with, the heating coil and "heat exchanger" can of course be replaced by a conventional heat exchanger with water-guiding ribs.

BRIEF DESCRIPTION OF THE DRAWINGS

The invention is described in more detail hereinbelow with reference to the accompanying drawing.

DETAILED DESCRIPTION OF THE INVENTION

Figure 1:
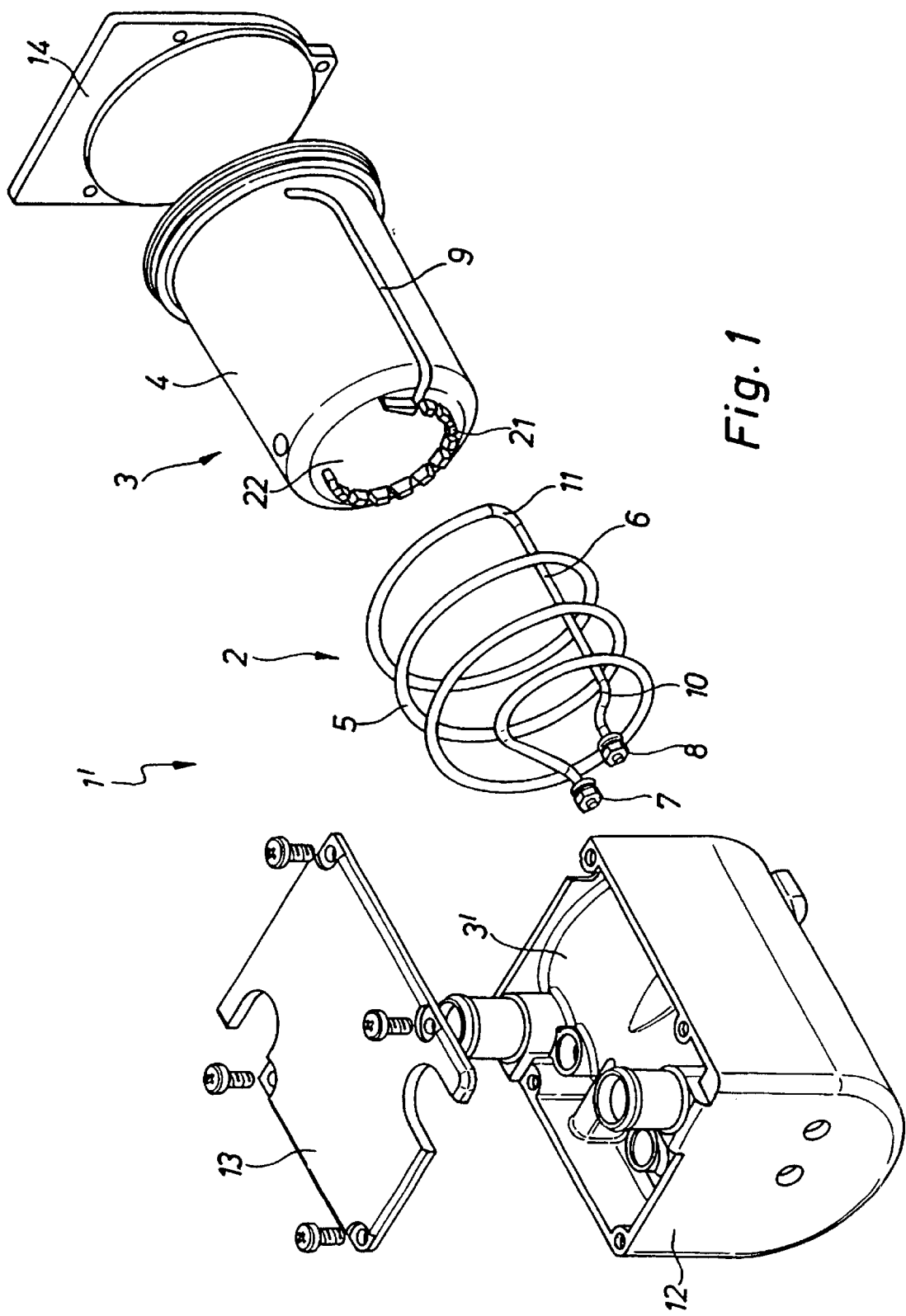
FIG. 1 shows a motor vehicle water heating equipment in a schematic perspective exploded view, for electrical heating by means of a heating coil.
Figure 2:
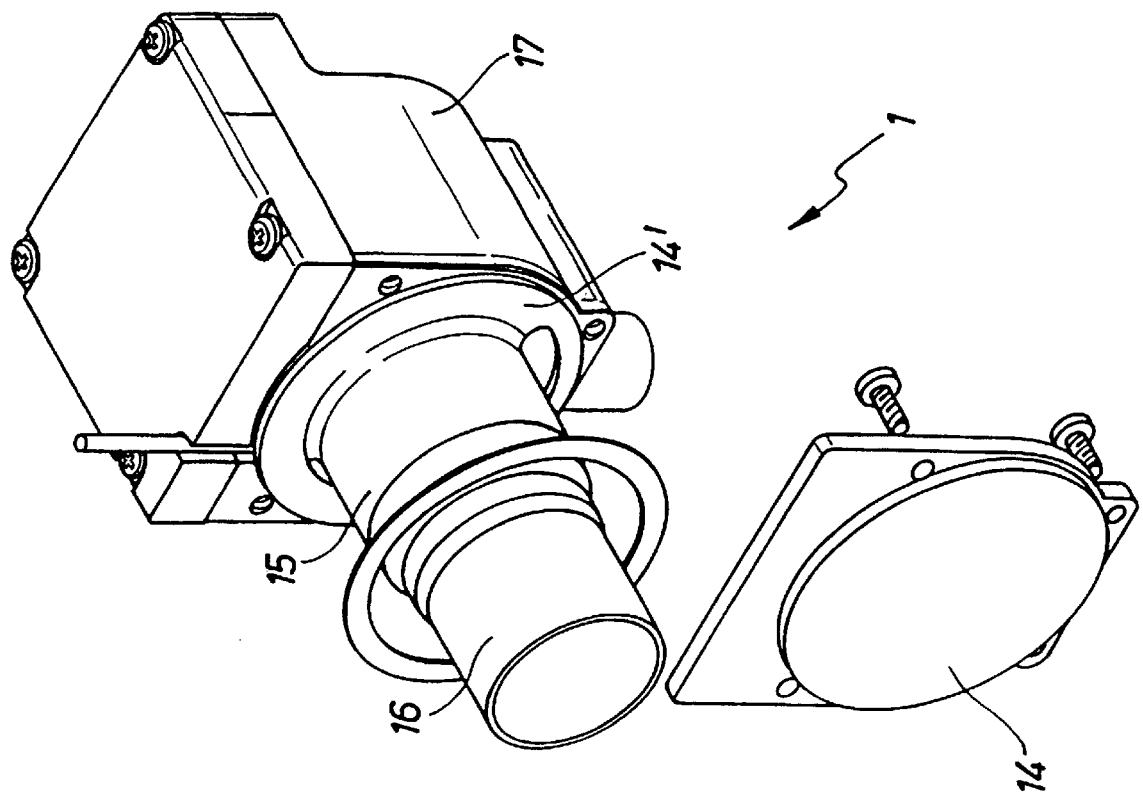
FIG. 2 shows the assembled motor vehicle water heating equipment with heating coil according to FIG. 1, operable with liquid fuel, with an added burner and combustion air fan.

According to FIG. 1, a motor vehicle heating equipment in the form of an electric heating equipment 1' includes a heating equipment portion which can also be used as a constructional unit for a fuel operated heating equipment 1 according to FIG. 2.

The constructional unit contains an electric heating coil 2 and an inner jacket portion 3 of a heat exchanger of a fuel-operated heating equipment 1, the electric heating coil 2 extending substantially on the outer periphery 4 of the inner jacket portion 3 or on the inner periphery of an outer jacket portion 3' of the heat exchanger or of the heat exchanger housing.

According to FIG. 1, the inner jacket portion 3 is constructed in the form of a pot and has a pot floor 22 and also spacer elements 21 between the pot floor 22 and the end wall 12 of the heat exchanger housing or heating equipment housing, for the creation of a throughflow space with respect to a housing end wall 12 and the pot floor in the assembled state. The axial end of the heat exchanger opposite the pot floor 22 is covered by an end cover 14, and the housing is likewise closed on the upper side by a flat cover 13.

The electric heating coil 2 is provided as an electrical heating insert and has a helicoid heating section 5 arranged on the jacket portion 3 and a straight return section 6, the electrical connections 7, 8 being situated on the one axial side of the jacket portion 3.

The jacket portion 3 has a substantially smooth outer surface 4.

The return section 6 of the electrical heating insert is received in an axial groove 9 along a generating line of the jacket portion 3.

The electrical heating coil 2 can be constituted as slightly resiliently prestressed or self-fixing in the radial direction against the jacket portion 3.

The return section 6 has curved end sections 10, 11, which are axial fixing aids of the electric heating coil 2 with respect to the jacket portion 3.

The helicoid heating section 5 is fitted to the shape of the outer contour of the jacket portion 3 and forms, in a jacket portion used as the heat exchanger of a fuel-operated heating equipment 1, water or air guiding ribs for a medium (water or air) flowing through to be heated.

The electrical connections 7, 8 are passed through a housing end side 12 of the heating equipment, are fastened to the housing end side 12, and are accessible from the outside for a current connection.

It will be apparent from FIG. 1 that in the assembled state an electric heating equipment 1' with an electric heating coil 2 is provided.

The electric heating equipment 1' according to FIG. 1 can be converted or expanded with simple means for fuel operation, according to FIG. 2.

For this purpose, the cover 14 according to FIGS. 1 and 2 is removed and the combustion chamber of the fuel-operated heating equipment 1 according to FIG. 2 is installed in the pot of the jacket portion 3 or heat exchanger, by coaxial arrangement of the flame tube 16 and of the burner 15.

It will be apparent that a heating equipment converted or expanded in this manner can be operated with fuel in order to produce hot air or hot water for motor vehicle heating or for a motor vehicle engine. The combustion exhaust gases are conducted away through the exhaust gas connection 19. The air or the water are conducted into and out of the equipment or the heat exchanger of the equipment through the equipment connections 20 on the upper side.

The constructional unit can therefore be used in a heating equipment as an electric heating device according to FIG. 1 and/or as a heating equipment operated with liquid fuel according to FIG. 2.

Thus according to the invention, with water as the heat exchange medium, for example, an electric heating coil can be inserted into the water jacket of a fuel-operated heating equipment. With a "heat exchanger" (which in this case however has no heat exchanging function: the electric heating coil also takes over the function of the water-conducting coil), this arrangement forms an electric supplementary heater.

This unit can also be retrofitted and expanded to a fuel-operated supplementary heater (by supplementation with a combustion chamber, fan with glow pin and flame sensor, temperature sensors and control equipment/heat exchanger and water jacket; possibly temperature sensors are even already present).

It should also be remarked that features in the dependent claims which can independently protected are to have protection in their own right regardless of the formal reference back to the main claim. In addition, all the inventive features contained in the whole application documents fall within the protective scope of the invention.

What is claimed is:

1. A heating equipment portion operated with liquid fuel, of a motor vehicle, in the form of a supplementary heater or auxiliary heater,
comprising a burner and a heat exchanger,
wherein
at least one portion of said fuel-operated heating equipment is provided as a constructional unit together with at least a portion of an electric heating equipment, and
wherein the constructional unit includes at least one electric heating loop or coil and a jacket portion comprising an inner and outer jacket portion of a heat exchanger of a fuel-operated heating equipment, with the electric heating loop or coil extending substantially on an outer periphery of the inner jacket portion or on an inner periphery of the outer jacket portion.

2. The heating equipment portion according to claim 1, wherein the electric heating loop or coil is provided as an electrical heating insert that includes a helicoid heating section arranged on or in the jacket portion and a straight return section, and having electrical connections situated on a one axial side of the jacket portion.

3. The heating equipment portion according to claim 2, wherein the jacket portion has a substantially smooth outer or inner jacket surface.

4. The heating equipment portion according to claim 2, wherein the straight return section of the electric heating insert is received in an axial groove along a generating line of the jacket portion.

5. The heating equipment portion according to claim 2, wherein the straight return section has curved end sections that are axial fixing aids of the electric heating loop or coil with respect to the jacket portion.

6. The heating equipment portion according to claim 2, wherein the helicoid heating section is fitted to a shape of the outer or inner contour of the jacket portion and in a jacket portion used as the heat exchanger of a fuel-operated heating equipment forms water- or air-guiding ribs for a medium flowing through to be heated.

7. The heating equipment portion according to claim 2, wherein the electrical connections are passed through a housing end side of a heating equipment, are fixed to the housing end side, and are accessible from outside for a current connection.

8. The heating equipment portion according to claim 1, wherein the electric beating loop or coil is slightly resiliently prestressed or self-fixing in a radial direction against the jacket portion.

9. The heating equipment portion according to claim 1, wherein the constructional unit has temperature sensors that are used for an electrical and a fuel-operated heating equipment.

10. The heating equipment portion according to claim 1, wherein the constructional unit is used interchangeably in a heating equipment.

11. The heating equipment portion according to claim 1, wherein the constructional unit is used exclusively as an electric heating device in a heating equipment.

12. The heating equipment portion according to claim 1, wherein the constructional unit is used in a heating equipment exclusively as a heating device operated with liquid fuel.

13. The heating equipment portion according to claim 1, wherein the constructional unit is used in a heating equipment as an electric heating device and as a heating device operated with liquid fuel.

* * * * *